(12) United States Patent
Quinton et al.

(10) Patent No.: US 11,398,929 B2
(45) Date of Patent: Jul. 26, 2022

(54) COMMUNICATION GATEWAY FOR COMMUNICATING DATA FRAMES FOR A MOTOR VEHICLE

(71) Applicant: Continental Automotive GmbH, Hannover (DE)

(72) Inventors: Damien Quinton, Toulouse (FR); Philippe Olivet, Toulouse (FR)

(73) Assignee: Continental Automotive GmbH

( * ) Notice: Subject to any disclaimer, the term of this patent is extended or adjusted under 35 U.S.C. 154(b) by 25 days.

(21) Appl. No.: 17/146,715

(22) Filed: Jan. 12, 2021

(65) Prior Publication Data

US 2021/0226818 A1 Jul. 22, 2021

(30) Foreign Application Priority Data

Jan. 17, 2020 (FR) ...................................... 2000454

(51) Int. Cl.
| | |
|---|---|
| *H04L 12/66* | (2006.01) |
| *H04L 12/40* | (2006.01) |
| *H04L 12/741* | (2013.01) |
| *H04L 45/745* | (2022.01) |

(52) U.S. Cl.
CPC ............. *H04L 12/66* (2013.01); *H04L 12/40* (2013.01); *H04L 45/745* (2013.01); *H04L 2012/40273* (2013.01)

(58) Field of Classification Search
CPC ....... H04L 12/66; H04L 12/40; H04L 45/745; H04L 2012/40273; G06F 13/4295; G06F 13/404
See application file for complete search history.

(56) References Cited

U.S. PATENT DOCUMENTS

| | | | | |
|---|---|---|---|---|
| 6,735,198 B1 * | 5/2004 | Edsall | ................... | H04L 45/54 370/469 |
| 6,807,172 B1 * | 10/2004 | Levenson | ........... | H04L 49/3009 370/428 |
| 2003/0051050 A1 | 3/2003 | Adelaide et al. | | |

(Continued)

FOREIGN PATENT DOCUMENTS

EP 1798904 A1 6/2007

OTHER PUBLICATIONS

French Search Report and Written Opinion for French Application No. FR2000454, dated Sep. 17, 2020, 9 pages.

*Primary Examiner* — Luat Phung
(74) *Attorney, Agent, or Firm* — RatnerPrestia

(57) ABSTRACT

A communication gateway for communicating data frames for a motor vehicle, the gateway being intended to be connected to a plurality of electronic control units via a communication bus, the gateway including: a memory region in which is stored a lookup table including an index list, with each of the indices of which is potentially associated a payload of a data frame received by the gateway and at least one indicator for determining at least one electronic control unit that is the recipient of the frame; as many management modules as there are electronic control units; the gateway being configured to record, in the lookup table, with a given index: the payload of the received data frame; at least one indicator of at least one recipient electronic control unit; each management module being configured to, when the communication bus is available, send the obtained payload via the communication bus.

10 Claims, 2 Drawing Sheets

(56) References Cited

U.S. PATENT DOCUMENTS

| | | |
|---|---|---|
| 2003/0226085 A1 | 12/2003 | Shingaki |
| 2006/0294286 A1* | 12/2006 | Duerk .................. G06F 13/385 |
| | | 710/306 |
| 2007/0133578 A1* | 6/2007 | Tani ...................... H04L 45/742 |
| | | 370/401 |
| 2008/0162860 A1 | 7/2008 | Sabbatni et al. |

* cited by examiner

[Fig. 1]
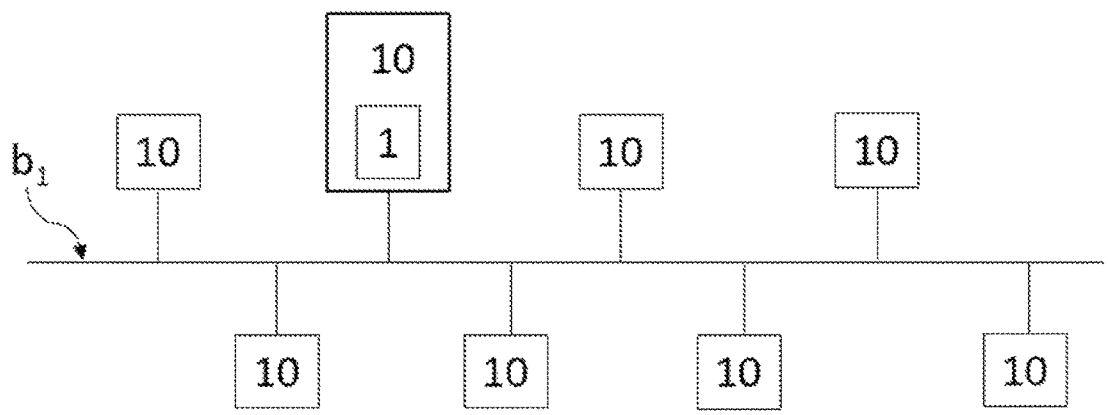
[Fig. 2]
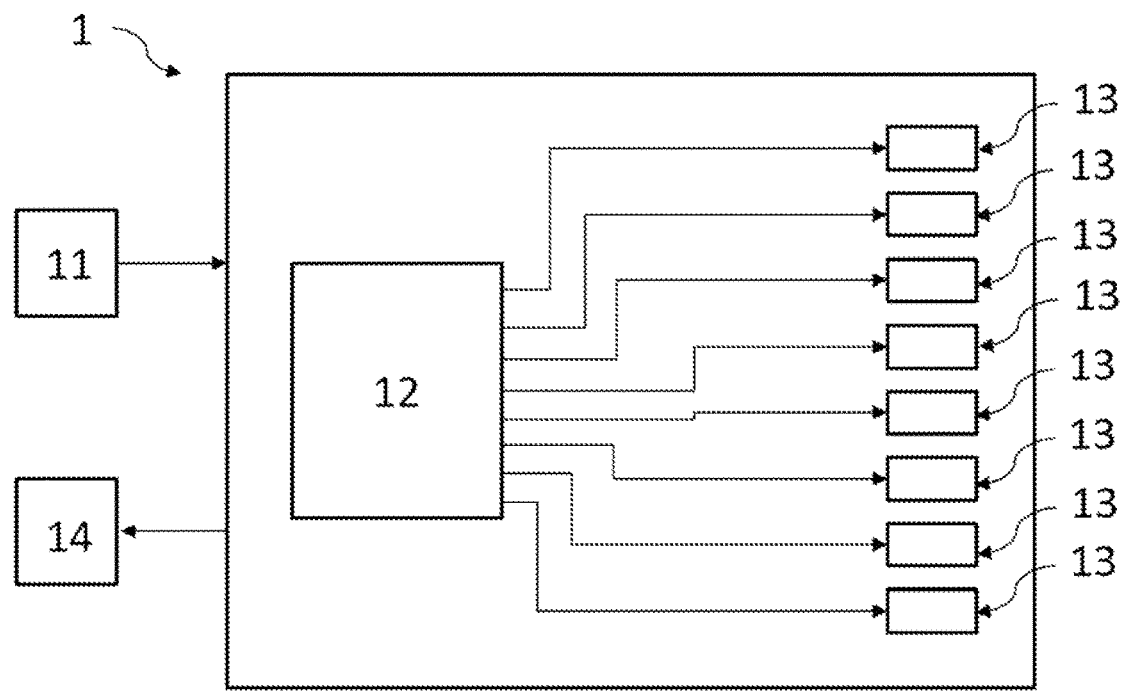
[Fig. 3]
| $i_x$ | DATA | DLC | ID | Dest |
|---|---|---|---|---|
|  |  |  |  |  |

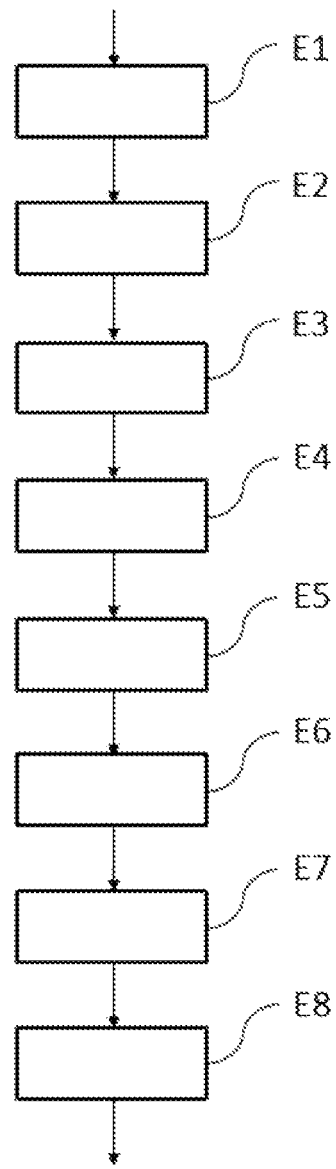
[Fig. 4]

COMMUNICATION GATEWAY FOR COMMUNICATING DATA FRAMES FOR A MOTOR VEHICLE

CROSS REFERENCE TO RELATED APPLICATIONS

This application claims priority to French Patent Application No. 2000454, filed Jan. 17, 2020, the contents of such application being incorporated by reference herein.

FIELD OF THE INVENTION

The invention relates to the field of electronic control units for a motor vehicle, and more precisely to an electronic control unit intended to be connected to a communication bus of a motor vehicle. A particular aim of the invention is to decrease the time taken to transmit data frames over a communication bus.

BACKGROUND OF THE INVENTION

In a known manner, a motor vehicle comprises a plurality of electronic control units (or ECUs), each allowing at least one item of equipment of said vehicle to be controlled.

To this end, the electronic control units are connected to one another by a communication bus, allowing them to exchange data frames. This bus may for example be of CAN ("Control Area Network") type, known per se to those skilled in the art.

To address the data frames to the recipient electronic control units, it is known practice to use a routing gateway, for example implemented by one of the electronic control units, through which all of the data frames pass.

In a known solution, the management of the data frames by the gateway is performed by using a waiting line of FIFO, for "first in first out", type. In this method, the data frames are processed in the order in which they arrive.

For example, in the case of a gateway connected to eight electronic control units via one communication bus, there are seven possible recipient electronic control units for one transmitting electronic control unit. For a data frame transmitted over a transmitting electronic control unit, the gateway copies the received data frame into the buffer of each of the other electronic control units. Next, each electronic control unit that has received the data frame in its buffer determines, by virtue of said copied data frame, whether it should in fact transmit the data frame or just ignore it.

However, copying the data frame into the buffer of each of the electronic control units may generate a substantial latency time, for example longer than 100 μs, which may prove to be problematic since this significantly slows down the exchanges of frames between the electronic control units, and even more so with use of a FIFO-type waiting line. These delays may in particular be detrimental in the operation of the vehicle or when carrying out diagnostics.

Specifically, in one existing solution, it is known practice to carry out diagnostics by using what is called a UDS (for "Unified Diagnostic Services") protocol between an external diagnostic tool and the gateway. In this protocol, the external tool transmits requests to one or more electronic control units which must respond to it within a given time frame, for example shorter than 100 μs. In this case, the latency times generated by the copying of the data frames by the gateway into the buffer of each of the electronic control units do not allow the electronic control units to respond within the given time frame, which may slow down or skew the diagnostics.

There is therefore a need for a solution that makes it possible to overcome these drawbacks at least in part.

SUMMARY OF THE INVENTION

An aspect of the invention relates to a communication gateway for communicating data frames for a motor vehicle, said gateway being intended to be connected to a plurality of electronic control units in order to exchange data frames, each electronic control unit of the plurality of electronic control units being connected to said gateway via a communication bus, said gateway comprising:
  a memory region in which is stored a lookup table comprising an index list, with each of the indices of which is potentially associated a payload of a data frame received by the gateway and at least one indicator for determining at least one electronic control unit that is the recipient of said received data frame;
  as many management modules as there are electronic control units, each management module being associated with one and only one electronic control unit;
  the gateway being configured to:
  receive a data frame via the communication bus;
  record, in the lookup table, with a given index:
    i. the payload of the received data frame;
    ii. at least one indicator of at least one recipient electronic control unit, which indicator is determined on the basis of the received data frame, the at least one electronic control unit that is the recipient of the data frame being predetermined;
  each management module being configured to:
    obtain at least one index from the lookup table, said index being associated with an indicator indicating that the electronic control unit associated with said management module is the recipient;
    record said obtained index in a series of indices classed in the chronological order in which they were obtained;
    determine the availability of the communication bus;
    when said communication bus is available, obtain, from the lookup table, the payload associated with the oldest index recorded in the series of indices and send said obtained payload via said communication bus.

Thus, the gateway according to an aspect of the invention allows the payload of each received data frame to be recorded in a single memory region, thus avoiding duplicating the copying of the payload into a plurality of memory regions.

Preferably, the gateway is configured to record the length of the payload recorded in the lookup table with the given index.

The length of the payload of a data frame, defining the number of bytes in said recorded payload, allows each management module of an electronic control unit that is the recipient of said data frame to know the length of the payload to be obtained.

Preferably, the number of indicators is equal to the number of electronic control units.

Thus, preferably, each indicator is associated with one electronic control unit.

Advantageously, each indicator comprises one bit.

An aspect of the invention also relates to a vehicle, in particular a motor vehicle, comprising a communication bus, a plurality of electronic control units connected by said communication bus and allowing data frames to be exchanged, and a gateway such as presented above.

Advantageously, the gateway is implemented by one of the electronic control units from among the plurality of electronic control units.

An aspect of the invention also relates to a method for transmitting data frames implemented by a gateway such as presented above, said method being noteworthy in that it comprises the steps of:

receiving a data frame via the communication bus;
determining at least one electronic control unit that is the recipient of the received data frame from among the plurality of electronic control units;
recording, in the lookup table, with a given index:
  i. the payload of the received data frame;
  ii. at least one indicator of at least one recipient electronic control unit, which indicator is determined on the basis of the received data frame;
obtaining, by the at least one management module of each recipient electronic control unit, at least one index from the lookup table, said index being associated with an indicator indicating that the electronic control unit associated with said management module is the recipient;
recording, by the at least one management module of each recipient electronic control unit, the obtained index in a series of indices classed in the chronological order in which they were obtained;
determining the availability of the communication bus;
when said communication bus is available, obtaining, from the lookup table, the payload associated with the oldest index stored in the series of indices and sending said obtained payload via said communication bus.

Advantageously, the recording step also comprises recording the length of the recorded payload in the lookup table with the given index.

The length of the payload of a data frame, recorded in the recording step, allows each management module of an electronic control unit that is the recipient of said data frame to know the length of the payload to be retrieved in the obtaining step.

Preferably, the number of indicators is equal to the number of electronic control units.

Thus, preferably, each indicator is associated with one electronic control unit.

Preferably, each indicator comprises one bit.

Advantageously, when the bit of an indicator is at 0, the electronic control unit associated with the indicator is not the recipient of the received data frame, and when the bit of an indicator is at 1, the electronic control unit associated with the indicator is the recipient of the data frame.

BRIEF DESCRIPTION OF THE DRAWINGS

FIG. 1 illustrates one embodiment of a gateway and of a plurality of electronic control units according to the invention;

FIG. 2 illustrates one embodiment of a gateway according to the invention;

FIG. 3 illustrates one embodiment of a lookup table according to the invention;

FIG. 4 shows one embodiment of the method according to the invention.

DETAILED DESCRIPTION OF AT LEAST ONE EMBODIMENT

One embodiment of a vehicle according to an aspect of the invention will now be presented.

With reference to FIG. 1, the vehicle comprises a plurality of electronic control units 10, each allowing at least one application of the vehicle to be implemented, said electronic control units 10 being connected via a communication bus b1.

According to the example presented here, the plurality of electronic control units 10 comprises eight electronic control units 10. However, the number of electronic control units 10 may obviously be different.

A gateway 1 is used in order to ensure the transmission of data frames between a plurality of electronic control units 10, said gateway 1 being for example implemented by one of the electronic control units 10.

The electronic control unit 10 implementing the gateway is configured to receive, via the communication bus b1, at least one data frame to be transmitted to at least one other electronic control unit 10.

The gateway 1 allows in particular a UDS, for "Unified Diagnostic Services", diagnostic communication protocol to be implemented.

With reference to FIG. 2, the gateway 1 comprises in particular a receive module 11, a memory region 12, a plurality of management modules 13 and a transmit module 14.

The receive module 11 est configured to receive, via the electronic control unit 10 implementing the gateway 1, the at least one data frame to be transmitted, and to transmit the at least one received data frame to the memory region 12.

The receive module 11 is configured to implement a routing function, making it possible to determine, for each received data frame, the at least one electronic control unit 10 that is the recipient of each data frame.

The receive module 11 is also configured to transmit, to the memory region 12, a list comprising the at least one recipient electronic control unit. The list comprising the at least one recipient electronic control unit comprises in particular a list of identifiers, each identifier representing a recipient electronic control unit 10.

The memory region 12 is connected to the receive module 11. In said memory region 12, a lookup table, shown with reference to FIG. 3, is stored.

The lookup table comprises an index list of indices ix, with each of the indices of which is potentially associated a payload DATA of a data frame received by the gateway 1, at least one indicator for determining at least one electronic control unit 10 that is the recipient of said received data frame, a length, commonly called the DLC, for "data length code", and a frame identifier ID for identifying said received data frame.

In the case that the plurality of electronic control units 10 comprises N electronic control units 10 (N being a natural integer greater than or equal to 2), the indicators also number N. Preferably and in the example below, each indicator is represented by one bit.

In the example presented here, the indicators are therefore eight in number. In other words, the set of indicators, denoted by "DEST", is advantageously represented by means of one byte, which by definition consists of eight bits.

The value of each indicator, i.e. the value of each bit of the set of indicators DEST, is associated with an electronic control unit 10. The last bit of the byte represents the first electronic control unit 10, the penultimate bit of the byte represents the second electronic control unit 10, . . . , the first bit of the byte represents the eighth electronic control unit 10.

When the bit of an indicator is at 0, this means that the electronic control unit 10 associated with said indicator is not the recipient of said data frame. On the other hand, when a bit of an indicator is at 1, this means that the electronic control unit 10 associated with said bit is the recipient of said data frame. In addition, conversely, in another embodiment, a bit at 0 could also define a recipient electronic control unit 10 and a bit at 1 could also define a non-recipient electronic control unit 10.

According to one embodiment, on starting up the gateway 1, a default set of indicators DEST is prerecorded with each index ix of the lookup table. For example, a byte comprising eight zeros is recorded with each index ix. It is when recording the payload DATA of a received data frame with a given index ix that the set of indicators DEST prerecorded with the index ix is modified in order to represent the set of electronic control units 10 that is the recipient of the data frame associated with the recorded payload DATA.

The length DLC of a data frame allows the number of bytes in the payload DATA to be defined.

The data frame identifier ID allows the data frame associated with said index ix to be identified.

In particular, the index list of indices ix comprises 512 values, ranging from 0 to 511. Thus, the lookup table may comprise 512 sets comprising the payload DATA of a received data frame, the at least one indicator for determining at least one electronic control unit 10 that is the recipient of said received data frame, the length DLC and the frame identifier ID that are associated with said received data frame.

The memory region 12 is configured to receive the data frames and, for each received data frame, a list comprising the at least one recipient electronic control unit 10, which are transmitted by the receive module 11.

The memory region 12 is also configured to record, in the lookup table, with a given index ix:
  i. the payload DATA of the received data frame;
  ii. at least one indicator of at least one recipient electronic control unit, which indicator is determined on the basis of the received data frame, in particular on the basis of the received list.

The gateway 1 comprises as many management modules 13 as there are electronic control units 10 and therefore, according to the example presented here, the gateway 1 comprises eight management modules 13. Each management module 13 is associated with one and only one electronic control unit 10 and is connected to the memory region 12.

Each management module 13 comprises a memory space in which a series of indices ix, classed in the order in which they were obtained by said management module 13, is recorded.

Each management module 13 of an electronic control unit 10 of the received data frame is configured to:
  obtain at least one index ix from the lookup table;
  store said obtained index ix in a series of indices ix classed in the order in which they were obtained;
  determine the availability of the communication bus b1;
  when said communication bus b1 is available, retrieve, from the lookup table, the payload DATA associated with the oldest index ix stored in the series of indices ix and send said retrieved payload DATA via said communication bus b1.

The transmit module 14 is connected to the plurality of management modules 13 and to the communication bus b1 and is configured to transmit the at least one data frame to be transmitted to the at least one recipient electronic control unit 10 via the communication bus b1.

With reference to FIG. 4, one embodiment of the method implemented by a gateway 1 such as presented above will now be presented.

In the following paragraphs, the implementation of the method for a gateway 1, connected to a plurality of electronic control units 10 comprising eight electronic control units 10, and for the receiving of a data frame by the gateway 1 will therefore be presented. The gateway 1 may obviously be connected to a different number of electronic control units 10 and/or receive a plurality of data frames, and reiterate the following method for each received data frame.

The method first comprises a preliminary step in which a default set of indicators DEST is prerecorded for each index ix of the lookup table. For example, a byte comprising eight zeros is recorded with each index ix.

The method first comprises a step of receiving E1 a data frame, by the receive module 11 of the gateway 1, via the electronic control unit 10 implementing the gateway 1, said electronic control unit 10 receiving the data frame via the communication bus b1.

After receiving the data frame, the receive module 11 implements the routing function in order to determine the at least one electronic control unit 10 that is the recipient of the received data frame from among the plurality of electronic control units 10.

Specifically, since the plurality of electronic control units 10 comprises eight electronic control units 10, for one transmitting electronic control unit 10 there are seven potential recipient electronic control units 10. The routing function of the receive module 11 therefore makes it possible to identify each recipient electronic control unit 10 from among the plurality of potential recipient electronic control units 10.

The receive module 11 then transmits said received data frame and a list, comprising the at least one determined recipient electronic control unit 10, to the memory region 12.

The memory region 12 then receives the data frame and said list comprising the at least one recipient electronic control unit 10, which are transmitted by the receive module 11.

Once the determining step E2 has been carried out, the method comprises a recording step E3.

In the recording step E3, an index ix, from among the index list of indices ix of the lookup table, that is referred to as a "free" index is first of all determined; in other words, this index is an index ix for which no payload DATA, frame identifier ID or length DLC is recorded.

The free index ix may be determined in particular by going through, in the lookup table, each index ix of the index list of indices ix and checking whether it is free or not free in order to determine the first free index ix.

Next, the at least one indicator of at least one recipient electronic control unit is recorded in the lookup table, with the determined free index ix. In other words, the set of indicators DEST relating to the received data frame, each bit of which is defined as at 1 or at 0 according to the at least one determined recipient electronic control unit 10, is recorded with the determined free index ix.

For this, according to one embodiment, if the free index ix has never been occupied by a payload DATA, the set of indicators DEST prerecorded with the free index ix is modified in order to represent the at least one determined recipient electronic control unit 10.

If a payload DATA has previously been recorded with (and deleted from) the free index ix, then the set of indicators DEST previously recorded with the index ix corresponds to the previously recorded payload DATA. The previously recorded set of indicators DEST is therefore modified in order to represent the at least one determined recipient electronic control unit 10.

According to another embodiment, no set of indicators DEST is kept with the free index ix, and the set of indicators DEST relating to the received data frame is directly recorded with the free index ix.

For example, in the case that the first and third electronic control units 10 are recipient electronic control units 10, the set of indicators is defined by the following byte: 00000101.

In addition, in the recording step E3, the payload DATA of the received data frame, the frame identifier ID and the length DLC of the received data frame are also recorded in the lookup table with the determined free index ix.

Additionally, the recording step E3 may be split into a first recording step and a second recording step. The first recording step consists in recording, directly after the step of receiving E1 the data frame by the memory region 12, the payload DATA, the frame identifier ID and the length DLC with a determined free index ix. The second recording step consists in recording, directly after the step of determining E2 the at least one recipient electronic control unit 10, the set of indicators DEST with said determined free index ix.

The method therefore next comprises a step of obtaining E4, by each management module 13 associated with an electronic control unit 10 that is the recipient of said received frame, the index ix from the lookup table where all of the information regarding the received data frame, and in particular the payload DATA of the received data frame, the set of indicators DEST, the frame identifier ID and the length DLC of the received data frame, is recorded.

According to the example presented above, it is therefore the management module 13 of the first and of the third electronic control units 10 which obtains the index ix.

After obtaining the index ix, the method comprises a step of storing E5 said obtained index ix in the series of indices ix recorded in the memory space of each management module 13 that is associated with a recipient electronic control unit 10.

Subsequent to the storing of at least one index ix in the memory space of each management module 13 associated with a recipient electronic control unit 10, the method comprises a step of determining E6, by each management module 13 of a recipient electronic control unit 10 that has stored the index ix, the availability of the communication bus b1.

If the communication bus b1 is available, then the method comprises a retrieving step E7 in which the management module 13 of each recipient electronic control unit 10 retrieves, from the lookup table, the payload DATA associated with the oldest index ix stored in the series of indices ix.

To determine the length of the payload DATA to be retrieved, the length DLC recorded in the lookup table is used. Specifically, the length DLC, of the payload DATA of a data frame, that is recorded in the lookup table allows each management module 13 of an electronic control unit 10 that is the recipient of said data frame to know the length DLC of the payload DATA to be retrieved.

Lastly, after retrieving the payload DATA, the management module 13 of each recipient electronic control unit 10 transmits said retrieved payload DATA to the associated recipient electronic control unit 10.

For this, the payload DATA is transmitted by the management module 13 of each recipient electronic control unit 10 over the communication bus b1 via the transmit module 14 in order to be transmitted to the at least one associated recipient electronic control unit 10.

Once the retrieving step E7 has been carried out, the method comprises a step of deleting E8 the payload DATA of the received data frame, the frame identifier ID and the length DLC of the received data frame, which were previously recorded with the determined free index ix, from the lookup table.

According to one embodiment, the set of indicators DEST is kept as it is and will be modified the next time a payload DATA is recorded with the index ix, as described in paragraph [0069].

According to another embodiment, the set of indicators DEST is also deleted.

Advantageously, the method implemented by a gateway 1 such as described above allows the payload DATA of each received data frame to be recorded only in the memory region 12 of the gateway 1. Additionally, each recorded payload DATA is only retrieved by the one or more electronic control units 10 that are the recipients of the data frame associated with each recorded payload DATA. For example, in the case of a data frame to be transmitted to the seven electronic control units 10, just one copy of the payload DATA will be made in the lookup table, which makes it possible to significantly decrease the time taken to transmit a data frame.

The invention claimed is:

1. A communication gateway for communicating data frames for a motor vehicle, said gateway being intended to be connected to a plurality of electronic control units in order to exchange data frames, each electronic control unit of the plurality of electronic control units being connected to said gateway via a communication bus, said gateway comprising:
   a memory region in which is stored a lookup table comprising an index list of indices, with each of the indices of which is potentially associated a payload of a data frame received by the gateway and at least one indicator for determining at least one electronic control unit that is the recipient of said received data frame;
   as many management modules as there are electronic control units, each management module being associated with one and only one electronic control unit;
   gateway being configured to:
      receive a data frame via the communication bus;
      record, in the lookup table, with a given index:
         i. the payload of the received data frame;
         ii. at least one indicator of at least one recipient electronic control unit, which indicator is determined on the basis of the received data frame, the at least one electronic control unit that is the recipient of the data frame being predetermined;
   each management module being configured to:
      obtain at least one index from the lookup table, said index being associated with an indicator indicating that the electronic control unit associated with said management module is the recipient;
      record said obtained index in a series of indices classed in the chronological order in which they were obtained;
      determine the availability of the communication bus;
      when said communication bus is available, obtain, from the lookup table, the payload (DATA) associated with the oldest index recorded in the series of indices and send said obtained payload (DATA) via said communication bus.

2. The gateway as claimed in claim 1, configured to record the length of the payload recorded in the lookup table with the given index.

3. The gateway as claimed in claim 1, wherein the number of indicators is equal to the number of electronic control units.

4. The gateway as claimed in claim 3, wherein each indicator comprises one bit.

5. A vehicle comprising a communication bus, a plurality of electronic control units connected by said communication bus and allowing data frames to be exchanged, and a gateway as claimed in claim 1.

6. A method for transmitting data frames implemented by a gateway according to claim 1, said method comprising:
   receiving a data frame via the communication bus;
   determining at least one electronic control unit that is the recipient of the received data frame from among the plurality of electronic control units;
   recording, in the lookup table, with a given index:
   iii. the payload of the received data frame;
   iv. at least one indicator of at least one recipient electronic control unit, which indicator is determined on the basis of the received data frame;
   obtaining, by the at least one management module of each recipient electronic control unit, at least one index from the lookup table, said index being associated with an indicator indicating that the electronic control unit associated with said management module is the recipient;
   recording, by the at least one management module of each recipient electronic control unit, the obtained index in a series of indices classed in the chronological order in which they were obtained;
   determining the availability of the communication bus;
   when said communication bus is available, obtaining, from the lookup table, the payload associated with the oldest index stored in the series of indices and sending said obtained payload via said communication bus.

7. The method as claimed in claim 6, wherein the recording step also comprises recording the length of the recorded payload in the lookup table with the given index.

8. The method as claimed in claim 6, wherein the number of indicators is equal to the number of electronic control units.

9. The method as claimed in claim 8, wherein each indicator comprises one bit.

10. The method as claimed in claim 9, wherein when the bit of an indicator is at 0, the electronic control unit associated with the indicator is not the recipient of the received data frame, and when the bit of an indicator is at, 1, the electronic control unit associated with the indicator is the recipient of the data frame.

* * * * *